US012736944B2

(12) United States Patent
Li et al.

(10) Patent No.: US 12,736,944 B2
(45) Date of Patent: Sep. 15, 2026

(54) HIGH-PRECISION RESONATOR GYROSCOPE AND MANUFACTURING PROCESS THEREOF

(71) Applicant: Sichuan Tulin Technology Co., Ltd., Chengdu (CN)

(72) Inventors: Yongde Li, Chengdu (CN); Teng Long, Chengdu (CN); Danmei Wang, Chengdu (CN); Jian Zhou, Chengdu (CN)

(73) Assignee: Sichuan Tulin Technology Co., Ltd., Chengdu (CN)

( * ) Notice: Subject to any disclaimer, the term of this patent is extended or adjusted under 35 U.S.C. 154(b) by 0 days.

(21) Appl. No.: 19/347,953

(22) Filed: Oct. 2, 2025

(65) Prior Publication Data

US 2026/0186467 A1 Jul. 2, 2026

(30) Foreign Application Priority Data

Dec. 27, 2024 (CN) ......................... 202411942853.7

(51) Int. Cl.
*G01C 19/56* (2012.01)
*G05B 19/4093* (2006.01)

(52) U.S. Cl.
CPC ......... *G05B 19/4093* (2013.01); *G01C 19/56* (2013.01); *G05B 2219/37134* (2013.01)

(58) Field of Classification Search
CPC ...... G05B 19/4093; G05B 2219/37134; G01C 19/56
See application file for complete search history.

(56) References Cited

U.S. PATENT DOCUMENTS

2021/0348504 A1* 11/2021 Xue ...................... E21B 47/022

FOREIGN PATENT DOCUMENTS

CN 110702089 A * 1/2020 ........... G01C 25/005
CN 116117331 A 5/2023

(Continued)

OTHER PUBLICATIONS

Zheng Chao et al., Review on the Quality Inhomogeneity Alignment Technology of Spherical Resonant Gyroscopes,"Navigation and Control", vol. 22, Issue 04,Nov. 17, 2023,pp. 17-25.

(Continued)

*Primary Examiner* — Gregory Robert Weber
(74) *Attorney, Agent, or Firm* — Birchwood IP

(57) ABSTRACT

The present application relates to the technical field of gyroscopes, and specifically to a high-precision resonator gyroscope and a manufacturing process thereof. The manufacturing process includes obtaining a resonator substrate from fused quartz material, and further includes the steps of model design, mass trimming, assembly and packaging, and testing and compensation. A shaft system dynamic balancing and polishing process is introduced into the manufacturing process, a windowing structure is arranged on the resonator substrate, and a balancing module is configured to release balancing flow to an inner surface of the resonator substrate, so that the dynamic balance is achieved, the polishing operation on the inner surface is completed through the polishing flow, and the effects of the trimming operation is more precisely predicted and evaluated. This method not only enhances trimming accuracy, but also reduces potential performance losses caused by over-trimming or under-trimming.

8 Claims, 1 Drawing Sheet

(56) References Cited

FOREIGN PATENT DOCUMENTS

| | | | |
|---|---|---|---|
| CN | 117226440 | A | 12/2023 |
| CN | 117308905 | A | 12/2023 |
| CN | 117723037 | A | 3/2024 |
| CN | 118049979 | A | 5/2024 |
| WO | 2021227010 | A1 | 11/2021 |

OTHER PUBLICATIONS

Ma Chuanzhen et al., New Advances in Key Performance and Manufacturing Process of Spherical Resonator,Journal of Mechanical Engineering, vol. 60, Issue 03,Apr. 28, 2024,pp. 354-371.

* cited by examiner

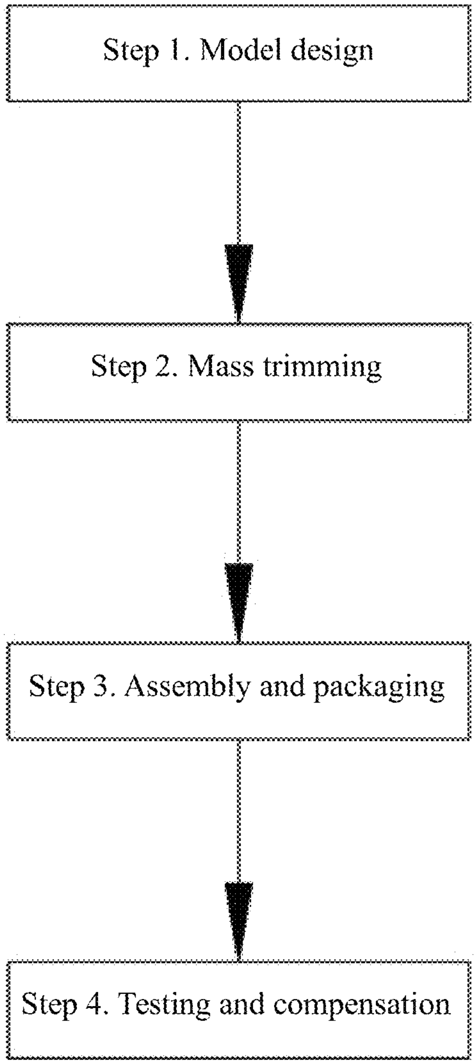
Step 1. Model design
Step 2. Mass trimming
Step 3. Assembly and packaging
Step 4. Testing and compensation

HIGH-PRECISION RESONATOR GYROSCOPE AND MANUFACTURING PROCESS THEREOF

CROSS-REFERENCE TO RELATED APPLICATIONS

This application claims priority to Chinese Patent Application No. 202411942853.7, filed on Dec. 27, 2024, which is hereby incorporated by reference in its entirety.

TECHNICAL FIELD

The present application relates to the technical field of gyroscopes, and specifically to a high-precision resonator gyroscope and a manufacturing process thereof.

BACKGROUND

A hemispherical resonator gyroscope (HRG), a high-precision gyroscope, has various advantages, such as impact resistance, radiation resistance, a small size, a light weight, low energy consumption, high reliability, and a long service life, and thus is successfully applied to national defense and military, communication satellites, manned spaceflight, astronomical observation, marine engineering, and other fields. A hemispherical resonator is the core component of the hemispherical resonator gyroscope. To achieve low frequency splitting and high quality factor, high machining precision of the hemispherical resonator is required. Specifically, the hemispherical resonators are typically manufactured with submicron precision and nanometer surface roughness.

It should be noted that the manufacturing requirements for high-performance hemispherical resonators have exceeded the current grinding and polishing capabilities. A polishing process similar to a shaft system dynamic balancing and polishing process must be introduced to further reduce the frequency splitting value. The accuracy of the trimming amount has a decisive influence on the performance of the final product. In the machining and manufacturing process, whether the grinding, polishing, ion beam or ultrafast laser is used, the precision machining of the resonator essentially requires stable and controllable mass removal, which requires that the relationship between the local mass removal and performance of the resonator needs to be clear. It should also be noted that, in addition to clarifying the corresponding relationship and improving manufacturing capabilities, the corresponding machining and manufacturing process requirements may also be reduced by changing the mechanical structure of the gyroscope.

SUMMARY

An objective of the present application is to provide a high-precision resonator gyroscope, so as to reduce the difficulty of machining and manufacturing process; and another objective of the present application is to provide a manufacturing process of a high-precision resonator gyroscope, so as to reduce the machining error caused by direct contact between the resonator and the manufacturing equipment during the processing.

The present application is implemented by the following technical solutions.

A manufacturing process of a high-precision resonator gyroscope includes: obtaining a resonator substrate from fused quartz material, and further includes the following steps: step 1. model design: detecting changes in external angles by using an azimuth of a wave pattern in a second-order bending mode of a hemispherical resonator to construct a manufacturing model, introducing a shaft system dynamic balancing and polishing process into the manufacturing model, and performing polishing operation to obtain a polished substrate; step 2. mass trimming: calculating a trimming amount for the polished substrate by the manufacturing model, and performing trimming operation according to the trimming amount to obtain a trimmed substrate; step 3. assembly and packaging: assembling and packaging the trimmed substrate in the step 2, an excitation cover, a base and an electrode unit to obtain a gyroscope; and step 4. testing and compensation: performing precision detection on the gyroscope in the step 3, and performing error compensation according to a precision detection result; wherein the resonator substrate is provided with a windowing structure, the manufacturing system includes a polishing module, a fixture module and a balancing module, and a polishing cavity is arranged at an end part of the polishing module; the shaft system dynamic balancing and polishing process is as follows: when being in an initial state, the resonator substrate is placed on the fixture module, an outer surface of the resonator substrate is attached to an opening of the polishing cavity, the balancing module releases balancing flow to an inner surface of the resonator substrate and enables the resonator substrate to rotate through the windowing structure; and after the resonator substrate maintains dynamic balance, the balancing module switches the balancing flow into polishing flow to pass through the windowing structure, and polishing operation on the inner surface of the resonator substrate is completed through continuous flowing of the polishing flow.

A high-precision resonator gyroscope includes a resonator with a windowing structure, a hemispherical resonator, an excitation cover, a base, and an electrode unit, wherein the electrode unit is a sector-shaped electrode.

Compared with the prior art, the present application has the following advantages and beneficial effects:

1. The shaft system dynamic balancing and polishing process is introduced into the manufacturing process, the windowing structure is arranged on the resonator substrate, the balancing module is configured to release the balancing flow to the inner surface of the resonator substrate, the dynamic balance is achieved, and the polishing operation of the inner surface is completed through the polishing flow.
2. The present application, through a quantitative approach, can more precisely predict and evaluate the effects of the trimming operation. This method not only enhances the accuracy of trimming, but also reduces potential performance losses caused by over-trimming or under-trimming.
3. According to the present application, the performance of the resonator gyroscope is significantly improved by precisely controlling the trimming process and maintaining the dynamic balance, and a manufacturer can more effectively adjust the mass distribution of the resonator substrate by performing trimming along high latitude lines, so that the performance loss caused by machining limitation is reduced. Meanwhile, the strategy of maintaining dynamic balance reduces the errors that may be introduced during the machining and further improves the accuracy and reliability of the resonator gyroscope.

BRIEF DESCRIPTION OF THE DRAWINGS

The drawings illustrated herein are used to provide a further understanding of the embodiments of the present application, constitute a part of the present application, and do not constitute a limitation to the embodiments of the present application. In the drawings:

FIG. 1 is a schematic flow chart of a process according to the present application.

DESCRIPTION OF EMBODIMENTS

To make the objectives, technical solutions and advantages of the present application more clearly understood, the present application is further described in detail below in conjunction with examples and drawings. The exemplary embodiments of the present application and the descriptions thereof are only used to explain the present application and are not intended to limit the present application. It should be noted that the present application is in practical development and use stage.

To make the technical solutions of the present application clearer, the professional terms involved in the present application are explained here.

In this application, the term "manufacturing system" refers to the entire system used to manufacture a high-precision resonator gyroscope, including components such as a polishing module, a fixture module, and a balancing module. The modules of the manufacturing system work together to complete the gyroscope manufacturing process.

In this application, the term "polishing module" refers to a component in the manufacturing system, with a polishing cavity provided at an end part thereof, for polishing a surface of the resonator substrate in the shaft system dynamic balancing and polishing process.

In this application, the term "fixture module" refers to a part of a manufacturing system used to hold a resonator substrate during polishing, so that a surface of the resonator substrate is attached to an opening of the polishing cavity.

In this application, the term "balancing module" refers to a key part of the manufacturing system, which is responsible for releasing balancing flow to the surface of the resonator substrate to start the rotation of the resonator substrate and maintain dynamic balance, and then switching to polishing flow to complete the polishing operation. The balancing module is equipped with a nozzle.

In this application, the term "adjusting module" refers to a part of the manufacturing system that adjusts the position and angle of the resonator substrate during the manufacturing process, especially when performing polishing on the inner surface, to ensure accuracy and uniformity of polishing.

In this application, the term "trimming amount" refers to a value calculated by the manufacturing model, which is used to guide the mass trimming operation on the polished substrate to ensure uniform mass distribution in the resonator substrate.

In this application, the term "excitation cover" refers to a part of the gyroscope that is assembled and packaged together with the trimmed substrate, the base, and the electrode unit during the assembly process of the resonator gyroscope.

In this application, the term "base" refers to a support part of the gyroscope, which together with the trimmed substrate, the excitation cover and the electrode unit constitutes a complete resonator gyroscope.

In this application, the term "electrode unit" refers to an important component assembled and packaged together with the trimmed substrate, the excitation cover and the base.

In this application, the term "windowing structure" refers to a structure on the resonator substrate that allows the balancing flow and polishing flow to pass through to achieve dynamic balancing and polishing operations.

In this application, the term "balancing flow" refers to a flow released to the resonator substrate through the nozzle of the balancing module, preferably pure water.

In this application, the term "polishing flow" refers to a floe released to the resonator substrate through the nozzle of the balancing module and maintaining the dynamic balance of the resonator substrate, and is preferably a mixture of cerium oxide polishing powder, sodium hydroxide powder and pure water compounded in a proportion of 1:0.5:20.

In this application, the term "solid wave gyroscope theory" refers to the theory of determining the rotational speed by analyzing the vibration mode inside the solid material, which is the theoretical basis for constructing the manufacturing model and calculating the trimming amount.

In this application, the term "process capability coefficient" refers to the parameter used to evaluate the process capability of the manufacturing process within the constraints of the manufacturing model.

In this application, the term "sensitivity" is defined as the derivative of the frequency splitting with respect to the trimming amount, which is used to evaluate the effect of the trimming amount on the performance of the resonator.

In this application, the term "trim angle" refers to the adjustment parameter used to guide the angle during the trimming process within the constraints of the manufacturing model.

In this application, the term "theoretical trimming amount" refers to the parameter obtained by inverse analysis of the sensitivity of the manufacturing model and used to guide the actual trimming operation.

In this application, the term "virtual rotational force" refers to a force applied to the resonator by controlling the electrodes during the precision testing process, causing the resonator to generate a virtual rotational speed for the purpose of testing the performance of the resonator.

In this application, the term "standing wave precession error equation" refers to a relationship between the virtual rotational speed generated by the resonator under the action of the virtual rotational force and the actual rotational speed used in precision testing to evaluate the performance of the resonator.

Embodiment 1

As shown in FIG. 1, a manufacturing process of a high-precision resonator gyroscope includes: obtaining a resonator substrate from fused quartz material, and further includes the following steps:

Step 1. Model design: detecting changes in external angles by using an azimuth of a wave pattern in a second-order bending mode of a hemispherical resonator to construct a manufacturing model, introducing a shaft system dynamic balancing and polishing process into the manufacturing model, and performing polishing operation to obtain a polished substrate;

Step 2. Mass trimming: calculating a trimming amount for the polished substrate by the manufacturing model, and performing trimming operation according to the trimming amount to obtain a trimmed substrate;

Step 3. Assembly and packaging: assembling and packaging the trimmed substrate in the step 2, an excitation cover, a base and an electrode unit to obtain a gyroscope;

Step 4. Testing and compensation: performing precision detection on the gyroscope in the step 3, and performing error compensation according to a precision detection result; wherein the resonator substrate is provided with a windowing structure, the manufacturing system includes a polishing module, a fixture module and a balancing module, and a polishing cavity is arranged at an end part of the polishing module; the shaft system dynamic balancing and polishing process is as follows: when being in an initial state, the resonator substrate is placed on the fixture module, an outer surface of the resonator substrate is attached to an opening of the polishing cavity, the balancing module releases balancing flow to an inner surface of the resonator substrate and enables the resonator substrate to rotate through the windowing structure; and after the resonator substrate maintains dynamic balance, the balancing module switches the balancing flow into polishing flow to pass through the windowing structure, and polishing operation on the inner surface of the resonator substrate is completed through continuous flowing of the polishing flow.

It should be noted that, in the machining and manufacturing process, whether the grinding, polishing, ion beam or ultrafast laser is used, the precision machining of the resonator essentially requires stable and controllable mass removal, which requires that the relationship between the local mass removal and performance of the resonator needs to be clear. However, in the existing manufacturing process, the direct contact between the resonator and the manufacturing system cannot be avoided. It may be understood that the rigid contact between the resonator and the manufacturing system inevitably brings large machining errors in the manufacturing process.

In view of the above problems, provided is a manufacturing process of a high-precision resonator gyroscope, which includes the following steps: preparing a resonator substrate from fused quartz material; performing model design, specifically, detecting angle changes by using an azimuth of a wave pattern in a second-order bending mode of a hemispherical resonator, and introducing a shaft system dynamic balancing and polishing process into the manufacturing model; performing mass trimming, specifically, performing trimming operation by calculating a trimming amount; assembling and packaging, specifically assembling and packaging the trimmed substrate, the excitation cover, the base and the electrode unit into a gyroscope; and finally, performing testing and compensation, specifically performing precision detection on the gyroscope and performing error compensation according to the result. In this process, the importance of the shaft system dynamic balancing and polishing process is particularly emphasized, the windowing structure is arranged on the resonator substrate, the balancing module is configured to release the balancing flow to the inner surface of the resonator substrate, the dynamic balance is achieved, and the polishing operation of the inner surface is completed through the polishing flow.

It should be understood that the rigid contact of a fixture can provide stable support, but increases the possibility of stress and damage caused by contact, which has an adverse effect on the surface quality and geometric accuracy of the resonator. In addition, the rigid contact may also cause slight deformation of the resonator during the machining process, which affects ultimate performance.

According to the shaft system dynamic balancing and polishing process, the balancing module releases balancing flow to an inner surface of the resonator substrate and enables the resonator substrate to rotate through the windowing structure; and after the resonator substrate maintains dynamic balance, the balancing module switches the balancing flow into polishing flow to pass through the windowing structure, and polishing operation on the inner surface of the resonator substrate is completed through continuous flowing of the polishing flow. This process not only reduces direct contact, but also effectively improves the machining precision and surface quality of the resonator substrate through polishing operations in a dynamic balance state.

It should be noted that, in the step 1, the construction process of the manufacturing model is as follows. Step 1-1, the angle changes are detected by changes in the azimuth of the wave pattern in the second-order bending mode of the hemispherical resonator. The angle change process follows $\theta(t)=-k\phi(t)+\beta(t)$, where k is a proportional coefficient; $\beta(t)$ is a zero-position drift rate; $\phi(t)$ is an angle change; $\theta(t)$ is a precession angle. According to the above step, when the resonator is subjected to external rotation or angle change, internal vibration modes of the resonator produce a corresponding change. The changes in these vibration modes are monitored, so that the changes in the external angle may be accurately perceived and calculated. Specifically, the vibration characteristics of the resonator under static and dynamic conditions are analyzed. Under static conditions, the vibration mode of the resonator is known; under dynamic conditions, that is, when the system in which the resonator is located undergoes rotation, the vibration mode changes due to the Coriolis effect. Measuring these changes allows the derivation of a mathematical model that relates the changes in vibration mode to the amount of external angle change.

This step can be used to accurately detect and quantify the angular changes of the resonator in a rotating system. Traditional detection methods may be affected by various errors, such as sensor accuracy limitations and interference from environmental factors. The detection of the changes in the azimuth of the wave pattern in the second-order bending mode of the resonator can provide a more accurate and reliable measurement method.

Step 1-2: The frequency splitting of the second-order bending mode is defined as a difference between natural frequencies of two basic vibration modes of the resonator. The definition process follows: $\Delta\omega=\omega_{21}-\omega_{22}$, where $\Delta\omega$ represents the frequency splitting; $\omega_{21}$ represents natural frequency of one basic vibration mode; $\omega_{22}$ represents natural frequency of the other basic vibration mode; the vibration characteristics of the resonator are analyzed in detail, and the natural frequencies of the resonator are determined through the solid wave gyroscope theory, and the relationship between these frequencies and the mass distribution of the resonator is further analyzed. Under this theoretical framework, frequency splitting is defined as the difference between the natural frequencies of the two basic vibration modes. The above step combines mathematical modeling and physical analysis to abstract the vibration behavior of the resonator into mathematical expressions and optimize frequency splitting by adjusting physical parameters. This step also includes simulating the dynamic response of the resonator under different operating conditions to verify the accuracy and reliability of the model.

The present application can significantly improve the performance of the resonator gyroscope by precisely controlling and optimizing frequency splitting. Conventional technologies are unable to accurately measure or control this parameter, resulting in limited precision of the gyroscope. However, the present application can not only reduce the vibration error of the resonator through precise frequency splitting control, but also increase the sensitivity of the resonator to external rotation, thereby achieving higher measurement precision and dynamic range.

Step 1-3: A relationship between frequency splitting and mass distribution is determined by the theory of solid-state wave gyroscope, the relationship follows $\Delta\omega=\lambda\rho_4$, where $\lambda$ represents a proportional coefficient, and $\rho_4$ represents a fourth harmonic amplitude in a circumferential direction; and the vibration mode of the resonator is linked to the mass distribution. In this process, the relationship between frequency splitting and mass distribution is qualified using the proportional coefficient and the fourth harmonic amplitude in the circumferential direction. This can achieve precise control of the vibration characteristics of the resonator, and thus a resonator gyroscope with better performance and higher precision is manufactured. In addition, the theory of solid-state wave gyroscope refers to detecting and measuring an angular velocity using a vibration mode of a solid medium (such as a quartz crystal). In a hemispherical resonator gyroscope, the vibration mode of a resonator changes due to changes in the angular velocity, which can be detected by measuring frequency splitting. The frequency splitting is a difference between natural frequencies of two fundamental vibration modes of the resonator. In this embodiment, the relationship between the frequency splitting and the mass distribution is preferably determined by finite element analysis or similar numerical methods, which can simulate the vibration behavior of the resonator under different mass distributions and calculate the corresponding frequency splitting.

Step 1-4: A sensitivity of a i-th trimming is defined as a derivative of the frequency splitting to the trimming amount, the definition process follows $$S_{mi}=\frac{\partial\Delta\omega}{\partial\Delta mi},$$

where $S_{mi}$ represents the sensitivity, and $\Delta mi$ represents the trimming amount. First, an initial frequency splitting of the resonator is determined using a manufacturing model. Then, through simulation or experimental methods, the mass distribution of the resonator is gradually adjusted, and the change in frequency splitting after each adjustment is measured. With these data, the rate of change of the frequency splitting to the trimming amount, i.e., sensitivity, is calculated. Through the clarification the relationship between sensitivity and the trimming amount, the present application allows manufacturers to optimize trimming strategies, achieving a more efficient and economical manufacturing process.

Step 1-5: An objective function and constraints of the manufacturing model are defined, where the objective function is to minimize frequency splitting and follows $\min_{\Delta mi}\Delta\omega$; the constraints include: sensitivity, trim angles, a trimming amount and a process capability coefficient, and the constraint process follows: $s.t0<S_{mi}\theta_i\phi_i<\Delta\omega<\Delta\omega_{max}$; where $s.tCp>1.33$ and $\theta_i$, $\phi_i$ $\theta_i$ both represent the trim angles, Cp represents the process capability coefficient, and $\Delta\omega_{max}$ represents a maximum frequency splitting amount allowed under manufacturing requirements.

It should also be noted that, compared with traditional technologies, the above steps are significantly different in precise control and quantitative analysis of the trimming process. The existing technology may rely more on experience or qualitative judgment, while the present application can more accurately predict and evaluate the effect of the trimming operation by using a quantitative method. This method not only enhances the accuracy of trimming, but also reduces potential performance losses caused by over-trimming or under-trimming.

It should be noted that, in the step 2, a theoretical trimming amount is inversely calculated through the sensitivity of the manufacturing model, and the inverse process follows $\Delta m_{cal}=S_{mi}\,\Delta\omega$; where $\Delta m_{cal}$ represents the theoretical trimming amount. The theoretical trimming amount of the resonator substrate is calculated through the manufacturing model, and then trimming operation is performed on the resonator substrate in the actual manufacturing process according to the calculation result, so as to correct the mass distribution of the resonator substrate and ensure that the difference (i.e., frequency splitting) between the inherent frequencies of the two basic vibration modes of the resonator meets the design requirement.

It should be noted that a high latitude line is selected for trimming when the trimming of the polished substrate at the windowing structure reaches the minimum removal mass limit of the trimming process. In the prior art, the trimming process cannot achieve ideal trimming effects in certain key areas due to the limitation of removal mass, resulting in uneven mass distribution of the resonator substrate, which in turn affects the performance of the resonator gyroscope. According to the present application, the above problem is effectively solved by converting the trimming position to the high latitude line when the minimum removal mass limit is reached. After the fixture module cancels the clamping of the resonator substrate, the resonator substrate maintains dynamic balance through the power brought by the polishing flow continuously released by the balancing module. This step further ensures that the resonator substrate can maintain dynamic balance during the trimming process, thereby reducing the stress and damage caused by the clamping or polishing process, and improving the machining precision and surface quality.

The performance of the resonator gyroscope is significantly improved by precisely controlling the trimming process and maintaining the dynamic balance, and a manufacturer can more effectively adjust the mass distribution of the resonator substrate by performing trimming along high latitude lines, so that the performance loss caused by machining limitation is reduced. Meanwhile, the strategy of maintaining dynamic balance reduces the errors that may be introduced during the machining and further improves the accuracy and reliability of the resonator gyroscope.

More specifically, the sensitivity of the resonator in the high-latitude area is relatively low. When the calculated trimming amount at a lip edge is lower than the minimum removal mass achievable by the current process, or the uncertainty of the current process is too large and the performance cannot be continuously further improved, a high latitude line is selected for four-point orthogonal trimming. The four-point orthogonal trimming process is not described in detail here.

It should be noted that after the resonator substrate maintains dynamic balance, the fixture module cancels the clamping effect on the resonator substrate. In this case, the resonator substrate maintains dynamic balance through the power brought by the polishing flow continuously released by the balancing module. It should also be noted that, in this case, the resonator substrate no longer relies on the support of the fixture module, but maintains dynamic balance through the power brought by the polishing flow continuously released by the balancing module. This allows the resonator substrate to complete the polishing operation without being affected by rigid clamping, thereby reducing the stress and damage that may be caused by clamping, and improving machining precision and surface quality.

It should be noted that the manufacturing system also includes an adjusting module. When an inner surface of the resonator substrate is polished, the resonator substrate is placed horizontally, the polishing module is arranged above the resonator substrate and the opening of the polishing cavity is in contact with an outer surface of the resonator substrate, the balancing module is arranged below the resonator substrate, and the position and angle of the balancing module are adjusted by the adjusting module.

It should also be noted that, first, the resonator substrate is placed horizontally to facilitate inner surface polishing. Then, the polishing module is arranged above the resonator substrate, and the opening of the polishing cavity is in close contact with the outer surface of the resonator substrate, ensuring that the polishing flow can accurately act on an area that needs to be polished. Meanwhile, the balancing module is arranged below the resonator substrate, and the position and angle of the balancing module are adjusted by the adjusting module to achieve the optimal polishing effect. The above steps allow for precise position and angle adjustment of the polishing module and the balancing module. This adjustment capability ensures the accuracy and uniformity of the polishing process, thereby improving the polishing quality of the inner surface of the resonator substrate.

It should be noted that, when the outer surface of the resonator substrate is polished, the resonator substrate is placed vertically, the polishing module is arranged horizontally and the opening of the polishing cavity is in contact with the outer surface of the resonator substrate, and the balancing module is symmetrically arranged with the polishing module based on the central axis of the resonator substrate and tilted upward. It should also be noted that, first, the resonator substrate is placed vertically on a special fixture or platform to ensure the stability of the resonator substrate and facilitate outer surface polishing; the polishing module is arranged horizontally, and the opening of the polishing cavity of the polishing module is in close contact with the outer surface of the resonator substrate; the balancing module is symmetrically arranged with the polishing module based on the central axis of the resonator substrate. In addition, the balancing module is tilted upward at a certain angle, which helps to achieve better dynamic balance during the polishing process.

Under the synergistic action of the polishing module and the balancing module, the outer surface of the resonator substrate is polished, the polishing module is responsible for removing materials and achieving required surface smoothness, and the balancing module ensures that the substrate is kept stable and dynamically balanced in the polishing process. After polishing is completed, quality detection is performed on the outer surface of the resonator substrate, so as to ensure that the polishing may meet the expected requirements on precision and surface roughness.

It should be noted that, in the step 3, the precision detection includes: applying a virtual rotational force using a control electrode of the gyroscope and acting on a standing wave precession error equation, so that the resonator generates a virtual rotational speed, and the sum of the current rotational speed and the virtual rotational speed of the resonator exceeds the angle measurement threshold. After assembly and packaging, the gyroscope needs to be tested for precision. This process involves the use of the control electrode of the gyroscope. In the precision detection, a virtual rotational force is applied through the control electrode. This virtual rotational force is a theoretical physical force not actually acting on the gyroscope but used to simulate and detect the performance of the resonator. The virtual rotational force acts on the standing wave precession error equation of the resonator. The standing wave precession error equation is a mathematical model that describes the change of the internal vibration mode of the resonator when the resonator is subjected to external rotation or angle change. The resonator generates a virtual rotational speed by applying a virtual rotational force. This virtual rotational speed is not an actual physical rotational speed, but is a parameter for evaluating the performance of the resonator. The virtual rotational speed is added to the actual rotational speed of the current resonator, and the sum of the virtual rotational speed and the actual rotational speed needs to exceed a specific angle measurement threshold. This threshold is a preset performance parameter for determining whether the resonator can accurately measure the angle change.

Embodiment 2

This embodiment only describes the parts that are different from Example 1. Specifically, a high-precision resonator gyroscope includes a resonator with a windowing structure, a hemispherical resonator, an excitation cover, a base, and an electrode unit, wherein the electrode unit is a sector-shaped electrode. The hemispherical resonator is provided with a recessed platform, an upper end surface of the recessed platform is flat, and the windowing structures are uniformly distributed on the flat area at intervals.

It should also be noted that, based on the existing machining and manufacturing of the resonator, in this embodiment, a pulsed laser is preferably used to ablate the recessed platform on a top of the resonator. The advantage of the ablation of the recessed platform by the pulsed laser is a more concentrated removal mass, and the laser has both ultra-strong and ultra-fast characteristics, which helps to reduce the mass imperfections of the resonator. Unlike windowing structures in the prior art, the windowing structures in this embodiment are located on the flat area of the recessed platform. These windowing structures, combined with the design of the recessed platform, help the resonator generate the desired vibration mode at a specific frequency, thereby achieving high-precision measurement of angular velocity. In terms of the control system, the demodulation module, the calculation module, the control module, and the modulation module work together to achieve precise control and measurement of the vibration state of the resonator. In addition, the redesign of the windowing structures is arranged on the flat area of the recessed platform, which is beneficial to the resonator to generate a required vibration mode under a specific frequency, so that the unexpected vibration response caused by the windowing structures is avoided, and the working performance of the resonator is improved.

The objectives, technical solutions and beneficial effects of the present application are further explained in detail with reference to the specific implementations described above, and it should be understood that the above-mentioned contents are merely specific implementations of the present application, and are not intended to limit the protection scope of the present application. Any modification, equivalent substitution, improvement and the like made within the spirit and principle of the present application shall all fall within the protection scope of the present application.

What is claimed is:

1. A manufacturing process of a high-precision resonator gyroscope, comprising: obtaining a resonator substrate from fused quartz material, and further comprising the following steps:

Step 1. Model design: detecting changes in external angles by using an azimuth of a wave pattern in a second-order bending mode of a hemispherical resonator to construct a manufacturing model, introducing a shaft system dynamic balancing and polishing process into the manufacturing model, and performing polishing operation to obtain a polished substrate;

step 2. mass trimming: calculating a trimming amount for the polished substrate by the manufacturing model, and performing trimming operation according to the trimming amount to obtain a trimmed substrate;

step 3. assembly and packaging: assembling and packaging the trimmed substrate in the step 2, an excitation cover, a base and an electrode unit to obtain a gyroscope;

step 4. testing and compensation: performing precision detection on the gyroscope in the step 3, and performing error compensation according to a precision detection result; wherein the resonator substrate is provided with a windowing structure, a manufacturing system comprises a polishing module, a fixture module and a balancing module, and a polishing cavity is arranged at an end part of the polishing module; the shaft system dynamic balancing and polishing process is as follows: when being in an initial state, the resonator substrate is placed on the fixture module, an outer surface of the resonator substrate is attached to an opening of the polishing cavity, the balancing module releases balancing flow to an inner surface of the resonator substrate and enables the resonator substrate to rotate through the windowing structure; and after the resonator substrate keeps dynamic balance, the balancing module switches the balancing flow into polishing flow to pass through the windowing structure, and polishing operation on the inner surface of the resonator substrate is completed through continuous flowing of the polishing flow; after the resonator substrate maintains dynamic balance, the fixture module cancels the clamping effect on the resonator substrate, and in this case, the resonator substrate maintains dynamic balance through power brought by the polishing flow continuously released by the balancing module;

in the step 1, the construction of the manufacturing model is as follows:

step 1-1: the angle changes are detected by changes in the azimuth of the wave pattern in the second-order bending mode of the hemispherical resonator, and the angle change process follows $\theta(t)=-k\phi(t)+\beta(t)$;

k is a proportional coefficient;

$\beta(t)$ is a zero-position drift rate;

$\phi(t)$ is an angle change;

$\theta(t)$ is a precession angle;

step 1-2: frequency splitting of the second-order bending mode is defined as a difference between natural frequencies of two basic vibration modes of the resonator, and the definition process follows: $\Delta\omega=\omega_{21}-\omega_{22}$;

$\Delta\omega$ represents the frequency splitting;

$\omega_{21}$ represents natural frequency of one basic vibration mode;

$\omega_{22}$ represents natural frequency of the other basic vibration mode;

step 1-3: a relationship between the frequency splitting and mass distribution is determined by theory of solid-state wave gyroscope, and the relationship follows:

$$\Delta\omega = \lambda\rho_4;$$

$\lambda$ represents a proportional coefficient;

$\rho_4$ represents a fourth harmonic amplitude in a circumferential direction;

step 1-4: a sensitivity of i-th trimming is defined as a derivative of the frequency splitting to the trimming amount, and the definition process follows:

$$S_{mi} = \frac{\partial\Delta\omega}{\partial\Delta mi};$$

$S_{mi}$ represents the sensitivity;

$\Delta mi$ represents the trimming amount;

step 1-5: an objective function and constraints of the manufacturing model are defined, the objective function is to minimize the frequency splitting and follows: $\min_{\Delta mi}\Delta\omega$;

the constraints comprise the sensitivity, trim angles, the trimming amount and a process capability coefficient, and the constraint process follows:

$$\text{s.t}0 < S_{mi}\theta_i\phi_i < \Delta\omega < \Delta\omega_{max};$$

$$\text{s.t}Cp > 1.33.;$$

$\theta_i$, $\phi_i$ both represent the trim angles;

Cp represents the process capability coefficient; and $\Delta\omega_{max}$ represents a maximum frequency splitting amount allowed under manufacturing requirements.

2. The manufacturing process of the high-precision resonator gyroscope according to claim 1, wherein in the step 2, a theoretical trimming amount is inversely calculated through the sensitivity of the manufacturing model, and the inverse process follows:

$$\Delta m_{cal} = S_{mi}\Delta\omega;$$

$\Delta m_{cal}$ represents the theoretical trimming amount.

3. The manufacturing process of the high-precision resonator gyroscope according to claim 2, wherein a high latitude line is selected for trimming when trimming of the polished substrate at the windowing structure reaches a minimum removal mass limit of the trimming process.

4. The manufacturing process of the high-precision resonator gyroscope according to claim 1, wherein the manufacturing system further comprises an adjusting module, when an inner surface of the resonator substrate is polished, the resonator substrate is placed horizontally, the polishing module is arranged above the resonator substrate and the opening of the polishing cavity is in contact with an outer surface of the resonator substrate, the balancing module is arranged below the resonator substrate, and a position and an angle of the balancing module are adjusted by the adjusting module.

5. The manufacturing process of the high-precision resonator gyroscope according to claim 4, wherein when the outer surface of the resonator substrate is polished, the resonator substrate is placed vertically, the polishing module is arranged horizontally and the opening of the polishing cavity is in contact with the outer surface of the resonator substrate, and the balancing module is symmetrically arranged with the polishing module based on a central axis of the resonator substrate and tilted upward.

6. The manufacturing process of the high-precision resonator gyroscope according to claim 1, wherein in the step 3, the precision detection comprises: applying a virtual rotational force using a control electrode of the gyroscope and acting on a standing wave precession error equation, so that the resonator generates a virtual rotational speed, and a sum of a current rotational speed and the virtual rotational speed of the resonator exceeds an angle measurement threshold.

7. A high-precision resonator gyroscope, comprising a resonator with a windowing structure, manufactured by the manufacturing process of the high-precision resonator gyroscope according to claim 1, and further comprising a hemispherical resonator, an excitation cover, a base, and an electrode unit, wherein the electrode unit is a sector-shaped electrode.

8. The high-precision resonator gyroscope according to claim 7, wherein the hemispherical resonator is provided with a recessed platform, an upper end surface of the recessed platform is flat, and the windowing structures are uniformly distributed on a flat area at intervals.

* * * * *